US009699082B2

(12) United States Patent
Moreno et al.

(10) Patent No.: US 9,699,082 B2
(45) Date of Patent: Jul. 4, 2017

(54) INTER-DOMAIN NETWORK TENANT IDENTIFIER

(71) Applicant: CISCO TECHNOLOGY, INC., San Jose, CA (US)

(72) Inventors: Victor Moreno, Carlsbad, CA (US); Fabio Maino, Palo Alto, CA (US); Vina Ermagan, Marina Del Rey, CA (US)

(73) Assignee: Cisco Technology, Inc., San Jose, CA (US)

( * ) Notice: Subject to any disclaimer, the term of this patent is extended or adjusted under 35 U.S.C. 154(b) by 317 days.

(21) Appl. No.: 14/010,707

(22) Filed: Aug. 27, 2013

(65) Prior Publication Data

US 2015/0063351 A1 Mar. 5, 2015

(51) Int. Cl.
*H04L 12/741* (2013.01)
*H04L 12/715* (2013.01)
*H04L 12/749* (2013.01)

(52) U.S. Cl.
CPC ............ *H04L 45/745* (2013.01); *H04L 45/04* (2013.01); *H04L 45/741* (2013.01)

(58) Field of Classification Search
None
See application file for complete search history.

(56) References Cited

U.S. PATENT DOCUMENTS

| | | | |
|---|---|---|---|
| 7,885,276 B1 * | 2/2011 | Lin | ............................... 370/401 |
| 8,352,941 B1 | 1/2013 | Protopopov et al. | |
| 2012/0254445 A1 * | 10/2012 | Kawamoto | ............ G06F 9/5088 709/226 |
| 2012/0311120 A1 * | 12/2012 | Yasuda | ................. H04L 41/145 709/223 |
| 2013/0058229 A1 * | 3/2013 | Casado | ................. H04L 45/745 370/252 |
| 2013/0107887 A1 * | 5/2013 | Pearson | ................... H04L 45/64 370/401 |
| 2013/0145006 A1 | 6/2013 | Tammam | |
| 2013/0287026 A1 * | 10/2013 | Davie | ..................... H04L 49/70 370/392 |
| 2013/0311663 A1 * | 11/2013 | Kamath | ............ H04L 29/08576 709/227 |
| 2014/0029451 A1 * | 1/2014 | Nguyen | ......................... 370/252 |
| 2014/0050223 A1 * | 2/2014 | Foo et al. | ...................... 370/400 |

(Continued)

FOREIGN PATENT DOCUMENTS

| | | | | |
|---|---|---|---|---|
| WO | PCT/US2011/039512 | * 12/2012 | ............. | H04L 12/28 |
| WO | WO/2012/170016 | * 12/2012 | ............. | H04L 12/28 |
| WO | WO 2012/170016 A1 | * 12/2012 | ............. | H04L 12/28 |

*Primary Examiner* — Jeffrey M Rutkowski
*Assistant Examiner* — Ning Li
(74) *Attorney, Agent, or Firm* — Cindy Kaplan

(57) ABSTRACT

In one embodiment, a method includes receiving a packet at a tunnel end point in a multi-tenant network, the packet comprising a destination, performing a lookup for the destination in a database comprising a mapping of global identifiers to local tenant identifiers for different hosting locations, each of the global identifiers uniquely identifying a tenant across all of the hosting locations, identifying a destination tunnel end point and a local tenant identifier for the destination, and inserting the destination tunnel end point and the local tenant identifier into the packet and forwarding the packet. An apparatus and logic are also disclosed herein.

17 Claims, 3 Drawing Sheets

(56) References Cited

U.S. PATENT DOCUMENTS

| | | | |
|---|---|---|---|
| 2014/0056298 A1* | 2/2014 | Vobbilisetty et al. | 370/355 |
| 2014/0112137 A1* | 4/2014 | Schlansker et al. | 370/235 |
| 2014/0115584 A1* | 4/2014 | Mudigonda | H04L 67/1095 718/1 |
| 2014/0192804 A1* | 7/2014 | Ghanwani | H04L 49/70 370/390 |
| 2014/0201733 A1* | 7/2014 | Benny et al. | 718/1 |
| 2014/0254603 A1* | 9/2014 | Banavalikar et al. | 370/401 |
| 2014/0269712 A1* | 9/2014 | Kidambi | H04L 12/4633 370/392 |
| 2014/0355450 A1* | 12/2014 | Bhikkaji | H04L 47/125 370/237 |
| 2014/0362859 A1* | 12/2014 | Addanki | H04L 12/465 370/392 |
| 2015/0058470 A1* | 2/2015 | Duda | 709/224 |

\* cited by examiner

INTER-DOMAIN NETWORK TENANT IDENTIFIER

TECHNICAL FIELD

The present disclosure relates generally to communication networks, and more particularly, to network tenant identifiers.

BACKGROUND

Cloud computing enables network access to a shared pool of configurable resources that can be rapidly provisioned and released with minimum management effort. Intrinsic to cloud computing is the presence of multiple tenants using the on-demand cloud infrastructure. Support for multi-tenancy has become an important requirement for data centers.

BRIEF DESCRIPTION OF THE DRAWINGS

Corresponding reference characters indicate corresponding parts throughout the several views of the drawings.

DESCRIPTION OF EXAMPLE EMBODIMENTS

Overview

Figure 1:
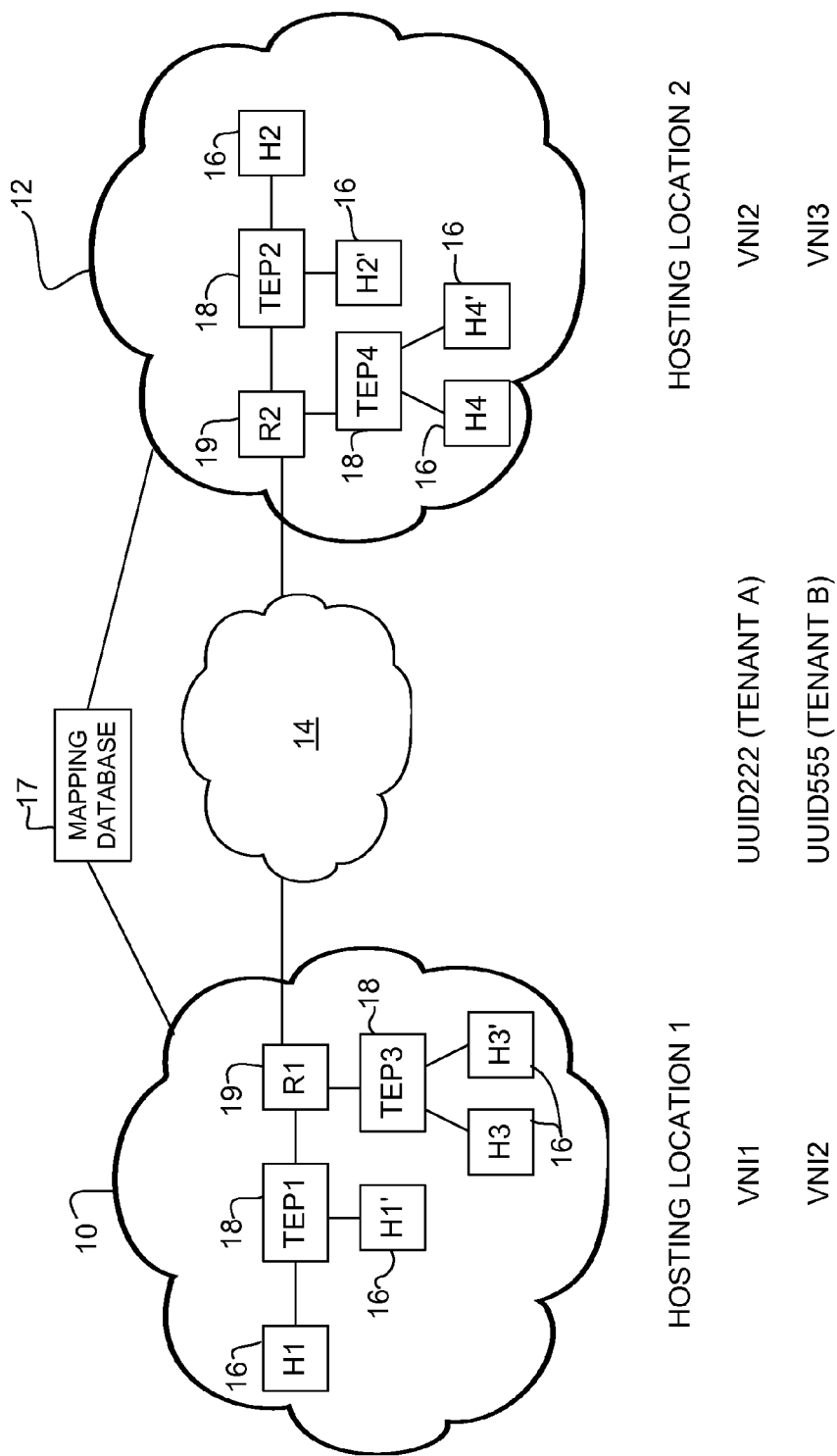
FIG. 1 illustrates an example of a network in which embodiments described herein may be implemented.

In one embodiment, a method generally comprises receiving a packet at a tunnel end point in a multi-tenant network, the packet comprising a destination, performing a lookup for the destination in a database comprising a mapping of global identifiers to local tenant identifiers for different hosting locations, each of the global identifiers uniquely identifying a tenant across all of the hosting locations, identifying a destination tunnel end point and a local tenant identifier for the destination, inserting the destination tunnel end point and the local tenant identifier into the packet, and forwarding the packet.

In another embodiment, an apparatus generally comprises an interface for receiving a packet in a multi-tenant network, the packet comprising a destination, memory for storing destination tunnel end points and local tenant identifiers associated with global identifiers, each of the global identifiers uniquely identifying a tenant across all hosting locations in the network, and a processor for performing a lookup, identifying a destination tunnel end point and a local tenant identifier for the destination, inserting the destination tunnel end point and the local tenant identifier into the packet, and forwarding the packet.

Example Embodiments

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

Infrastructure as a Service (IaaS) cloud services deliver computer infrastructure as a service. Rather than purchasing servers, software, data center space, or network equipment, customers instead purchase these resources as an outsourced service. In the context of IaaS cloud services, data centers host workloads from different tenants in shared facilities. The collocation of assets from different organizations poses a series of security needs. One important security mechanism in these environments is the segmentation of the network infrastructure into virtual networks that will keep the assets from different organizations secure from each other. In order to achieve such network segmentation, overlays with tenant identifiers may be broadly utilized to uniquely label entries in forwarding tables, policy lists, and state tables as belonging to a specific tenant. The uniqueness of the tenant identifier may be done within a single administrative domain. However, providing uniqueness of these identifiers across multiple administrative domains may pose scale and backward compatibility challenges.

As cloud services evolve they are expected to be increasingly federated and inter-domain connectivity should become the norm, rather than the exception. As the clouds federate, two main problems arise with the use of a flat number space. The space may not be large enough to provide unique identifiers to all of the segments needed by different tenants on a global basis. There is also a high likelihood of tenant identifier collisions between organizations since each organization is autonomous in the assignment of tenant identifiers. As organizations start interconnecting these collisions need to be resolved.

The embodiments described herein extend the tenant identifier space in the control plane to a larger bit space, while keeping tenant identifier labels in the data plane at their current lengths, and having these existing data plane labels loosely coupled to the control plane tenant identifiers. In one or more embodiments, demand based forwarding is used to facilitate the separation of control plane and data plane identifiers. The embodiments may enable, for example, global uniqueness of tenant identifiers while preserving currently deployed 24-bit tenant identifier labels.

Referring now to the drawings, and first to FIG. 1, an example of a network in which embodiments described herein may be implemented is shown. For simplification, only a small number of network elements are depicted. The network shown in FIG. 1 is a multi-tenant network comprising two hosting locations (e.g., data centers or other networks) 10, 12 interconnected by a transit network 14. The transit network 14 may include one or more networks (e.g., local area network, metropolitan area network, wide area network, virtual private network, enterprise network, Internet, intranet, radio access network, public switched network, or any other network). The network may include any number or type of network devices that facilitate passage of data over the network (e.g., routers, switches, gateways) and network devices that operate as hosts (e.g., servers, virtual machines, clients, endpoints).

Network 10 includes a plurality of hosts 16 (H1, H1', H3, H3'). Network 12 also includes a plurality of hosts 16 (H2, H2', H4, H4'). In this example, hosts H1, H2, H3, and H4 belong to tenant A and hosts H1', H2', H3', and H4' belong to tenant B. Networks 10 and 12 each include two tunnel end points (TEPs) 18 (TEP1, TEP3, and TEP2, TEP4, respectively). The tunnel end points may be routers, switches, or any other network device operable to forward traffic. In the example shown in FIG. 1, each network 10, 12 includes a router 19 (e.g., regular transit router) (R1, R2, respectively) in communication with the transit network 14.

Network 10 is referred to as hosting location 1 and network 2 is referred to as hosting location 2. As described in detail below, each hosting location has its own local tenant identifiers, referred to herein as Virtual Network Identifiers (VNIs). The term 'local tenant identifier' as used herein refers to the local domain of the destination. A global identifier that is unique across all organizations that may host a tenant at any point in time is referred to herein as a Universally Unique Identifier (UUID). Each of the global identifiers (UUIDs) uniquely identifies a tenant across all hosting locations in the network. In the example shown in FIG. 1, tenant A has a UUID 222 and tenant B has a UUID 555.

The UUIDs are mapped to different VNIs for different locations. The UUID to VNI mapping varies depending on the location of the traffic's destination. Thus, for a given tenant, the resulting VNI for their assigned UUID is one VNI value for destinations hosted in one hosting organization (e.g., service provider) and may be a different VNI value for destinations hosted in a different service provider. In one embodiment, mappings of the UUIDs to VNIs are stored in a network database 17. Details of the mapping are described further below along with examples.

It is to be understood that the network shown in FIG. 1 and described above is only an example and that networks having different topologies or network devices may be used without departing from the scope of the embodiments.

Figure 2:
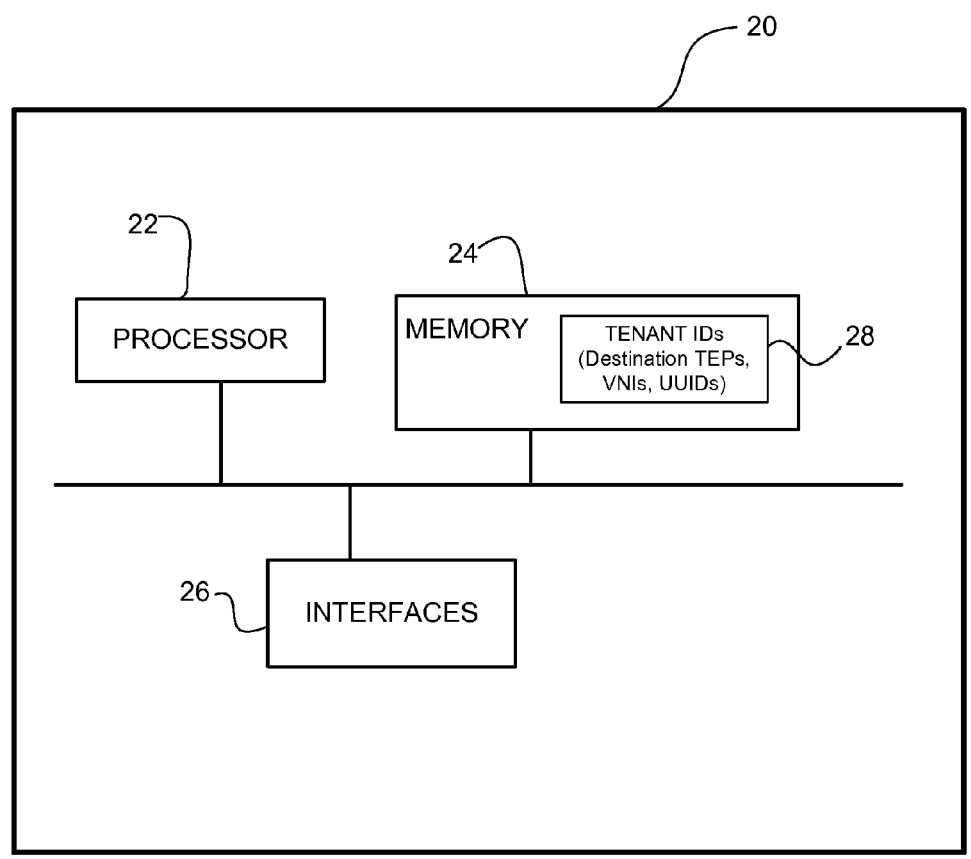
FIG. 2 depicts an example of a network device useful in implementing embodiments described herein.

FIG. 2 illustrates an example of a network device 20 (e.g., tunnel end point 18 in FIG. 1) that may be used to implement the embodiments described herein. In one embodiment, the network device 20 is a programmable machine that may be implemented in hardware, software, or any combination thereof. The network device 20 includes one or more processor 22, memory 24, and network interfaces 26.

Memory 24 may be a volatile memory or non-volatile storage, which stores various applications, operating systems, modules, and data for execution and use by the processor 22. For example, memory 24 may include a database 28 containing destination tunnel end points and local identifiers (VNIs) associated with global identifiers (UUIDs).

Logic may be encoded in one or more tangible media for execution by the processor 22. For example, the processor 22 may execute codes stored in a computer-readable medium such as memory 24. The computer-readable medium may be, for example, electronic (e.g., RAM (random access memory), ROM (read-only memory), EPROM (erasable programmable read-only memory)), magnetic, optical (e.g., CD, DVD), electromagnetic, semiconductor technology, or any other suitable medium.

The network interfaces 26 may comprise any number of interfaces (linecards, ports) for receiving data or transmitting data to other devices. The network interface 26 may include, for example, an Ethernet interface for connection to a computer or network.

It is to be understood that the network device 20 shown in FIG. 2 and described above is only an example and that different configurations of network devices may be used. For example, the network device 20 may further include any suitable combination of hardware, software, algorithms, processors, devices, components, or elements operable to facilitate the capabilities described herein.

Figure 3:
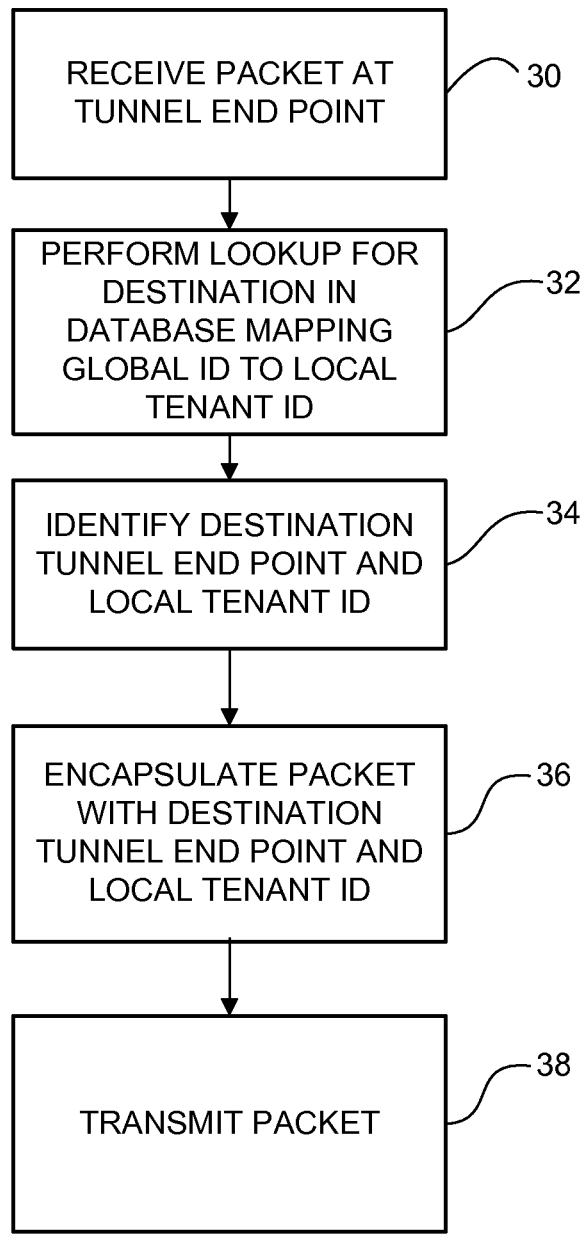
FIG. 3 is a flowchart illustrating a process for using inter-domain network tenant identifiers, in accordance with one embodiment.

FIG. 3 is a flowchart illustrating a process for intra-tenant communication using a global identifier. At step 30, the tunnel end point 18 receives a packet (e.g., TEP1 receives packet from H1 destined for H2 (FIG. 1)). The TEP 18 performs a lookup for the destination identified in the packet in a database mapping global IDs to local tenant IDs for different hosting locations (step 32). As described below, the database may be a demand based database located in the network (e.g., mapping database 17 in FIG. 1) or a local database at the TEP. Information obtained from the lookup may be stored at the TEP (e.g., cached in a network segment container such as a VRF (Virtual Routing and Forwarding) associated with the global identifier). The TEP 18 identifies the destination TEP and VNI (e.g., TEP2 and VNI2) based on results of the lookup (step 34). The information from the mapping database is used to encapsulate the packet with the destination TEP and VNI (step 36). The TEP 18 then forwards the encapsulated packet towards the destination TEP (step 38).

It is to be understood that the process illustrated in FIG. 3 is only an example and that steps may be added or modified, without departing from the scope of the embodiments.

In one embodiment, the UUID has a large numerical range (e.g., 128 bits) and the VNI has a smaller numerical range (e.g., 24 bits). The UUID may be used for control plane purposes mainly and the VNI value used to tag traffic in the data plane.

The UUID may be managed, for example, by a registrar such as those in charge of distribution of IP addresses, in order to keep the UUID globally unique. Alternatively, the UUID may be derived from existing allocation of globally routable IP prefixes, which are already configured to be unique. It is to be understood that these are only examples and that any other administrative mechanism may be used to ensure the uniqueness of the UUID.

In one embodiment a lookup is done for a given destination within the context of its tenant UUID and the destination's location. In one example, the lookup returns at least the following information tuple: <destination TEP, destination VNI>, where the returned destination VNI is the VNI value corresponding to the UUID at the destination hosting organization and may be different than the VNI value used for the same UUID at the source hosting organization. When the source and destination locations are the same, the VNI should generally be the same for both source and destination.

The lookup may be done, for example, against a demand based network database, such as those found in DNS (Domain Name System) or LISP (Locator/Identifier Separation Protocol). The network database 17 (FIG. 1) may comprise a plurality of databases distributed throughout the network. The lookup may also be done against an RIB (Routing Information Base) previously distributed by a push protocol such as BGP (Border Gateway Protocol) or any IGP (Interior Gateway Protocol). Thus, the information may be stored at the TEPs 18 only as needed (pull/demand based system) or the information may be stored at all TEPs (push based system). The mapping database may be dynamically created as hosts come online.

In one embodiment, the data packets are tagged with the destination VNI value resulting from the lookup in the database, but not tagged with the UUID value. The UUID is used for control plane tagging as well as table segmentation in the network location databases and in the caches on forwarding devices. The UUIDs are preferably associated to standard network segmentation compartments (tables) such as VLANs (Virtual Local Area Networks) or VRFs (Virtual Routing and Forwarding).

Both a local and global identifier are provided for the network segments, making the VNIs locally significant, therefore allowing the normalization of tenant IDs across hosting organizations by introducing a level of indirection in the tenant ID space and making the UUID the globally significant identifier, while the VNI plays a location significant role in segmenting the data plane.

The following examples describe an intra-tenant flow with source and destination in different hosting organizations, and an intra-tenant flow with source and destination within the same hosting organization.

Referring again to FIG. 1, H1, H2, H3, and H4 are all hosts in tenant A (222) and are registered in a network database as follows:

H1-TEP1-UUID222-VNI1
H3-TEP3-UUID222-VNI1
H2-TEP2-UUID222-VNI2
H4-TEP4-UUID222-VNI2

H1' through H4' are all hosts in tenant B (555) and are registered in a network database as follows:

H1'-TEP1-UUID555-VNI2
H3'-TEP3-UUID555-VNI2
H2'-TEP2-UUID555-VNI3
H4'-TEP4-UUID555-VNI3

When H1 wants to talk to H2, H1 sends a packet to H2. TEP1 receives this packet and performs a lookup in the network database 17 for H2. Per the previous registration, the database returns the entry for H2: <H2-TEP2-UUID222-VNI2>. TEP1 caches this information (e.g., in a network segment container such as a VRF). The VRF is associated with UUID222, the local VNI for 222 (VNI1) and the interface on which H1 connects to TEP1. The information cached in the VRF for H2 includes the tuple of <dest-TEP, dest-VNI>. With this information, TEP1 proceeds to encapsulate the traffic to the destination TEP=TEP2, with the appropriate destination VNI=VNI2. When TEP2 receives the encapsulated packet, it knows which container (VRF) to use to lookup the destination based on the association of VNI2 with the VRF where H2 resides (i.e., the VRF to which H2 is locally connected).

VNI uniqueness is preferably guaranteed within a location/organization, but VNI reuse is possible across organizations. In order to make the VNIs unique on the wires as traffic travels across organizations, the forwarding is done based on the <dest-TEP, dest-VNI> tuple. In the example shown in FIG. 1, a packet destined to <TEP1, VNI2> belongs to tenant UUID555, while a packet destined to <TEP2, VNI2> is tenant UUID222 traffic, even though they both use the same VNI value. Thus, the VNI is considered within the context of the destination location and the destination TEP determines location. In this example, the administrator of location 1 has assigned VNI2 to tenant 555, while the administrator of location 2 has assigned the same VNI value of VNI2 to tenant 222. The embodiments therefore allow for VNI reuse without suffering from collisions. For example, when host H1' in tenant 555 needs to send packets to H2', it will resolve <UUID555, H2'> to <TEP2, VNI3> and not use the VNI2 value which on TEP2 (location 2) corresponds to a different tenant (222).

Also, since forwarding is based on the tuple of TEP and VNI, there is no aliasing at the source site. For example, when H1 talks to H2 in tenant 222, this traffic is tagged with VNI2. As this tagged traffic traverses location 1, VNI2 is not confused with that of tenant 555 on location 1 since the traffic is encapsulated in TEP2. Even if the traffic were to use TEP3 as a transit router, TEP3 would look at the two tuple of destination TEP and VNI and know that this is not VNI2 in the context of TEP3's local site (Tenant 555 in location 1), but instead corresponds to another tenant elsewhere (tenant 222 in location 2), and therefore forwards the encapsulated traffic to the destination TEP in the header (TEP2).

Forwarding within the same location follows the same logic of registration and resolution of the UUID into a VNI as previously described. When H1 sends a packet to H3 (all in tenant 222 and all in hosting location 1), TEP1 consults the network database 17 and obtains the tuple <H3-TEP3-UUID222-VNI1> and encapsulates the packet to TEP3 with VNI1, which is the same VNI H1 is locally assigned in TEP1. Decpsulation and identification of the egress VRF happens in TEP3 as described above.

As can be observed from the foregoing, the embodiments may provide a number of advantages. For example, the embodiments avoid collisions of tenant identifiers when interconnecting independent organizations. Also, very large scale of segment identifiers in the data plane may be achieved by using the <TEP, VNI> tuple described above to provide uniqueness in the data plane. The embodiments allow for the use of shorter tenant identifier tags in data packets. Shorter tags provide more effective data throughput on more cost effective hardware. The embodiments provide an incremental mechanism to evolve the segmentation identifier space from its current definition to one that will allow the federation of cloud organizations, without requiring a massive renumbering of existing deployments.

Although the method and apparatus have been described in accordance with the embodiments shown, one of ordinary skill in the art will readily recognize that there could be variations made without departing from the scope of the embodiments. Accordingly, it is intended that all matter contained in the above description and shown in the accompanying drawings shall be interpreted as illustrative and not in a limiting sense.

What is claimed is:

1. A method comprising:
  receiving from a host, a packet at a tunnel end point at a first hosting location in a multi-tenant network, the packet comprising a destination at a second hosting location in the multi-tenant network, said first and second hosting locations interconnected by a transit network, the tunnel end point operable to forward traffic received from the host, each of said hosting locations comprising its own local tenant identifiers;
  performing a lookup for the destination at the second hosting location in a database comprising a mapping of global identifiers to said local tenant identifiers and destination tunnel end points for said hosting locations, wherein each of the global identifiers uniquely identifies a tenant across all of said hosting locations and each of the local tenant identifiers mapped to one of the global identifiers is locally significant in one of said hosting locations, wherein at least one of said global identifiers is mapped to different said local tenant identifiers at different of said hosting locations and a same local tenant identifier is used to identify different tenants at said first and second hosting locations;
  identifying a local tenant identifier for the destination at said second hosting location and a destination tunnel end point associated with the destination at said second hosting location based on said mapping;
  inserting the destination tunnel end point and the local tenant identifier into the packet;

forwarding the packet from the tunnel end point and over the transit network using the destination tunnel end point and the local tenant identifier; and using the local tenant identifier to tag traffic in a data plane and the global identifier in a control plane.

2. The method of claim 1 further comprising storing at the tunnel end point, the destination tunnel end point and the local tenant identifier in memory associated with the global identifier.

3. The method of claim 1 wherein an entry in the database comprises the destination, the destination tunnel end point, the global identifier, and the local tenant identifier.

4. The method of claim 1 wherein the local tenant identifier comprises a virtual network identifier.

5. The method of claim 1 wherein the global identifier comprises a large numerical range and the local tenant identifier comprises a smaller numerical range.

6. The method of claim 5 wherein the local tenant identifier comprises 24 bits.

7. The method of claim 1 wherein the forwarded packet does not include the global identifier.

8. The method of claim 1 wherein the database comprises a demand based network database.

9. An apparatus comprising:
an interface for receiving from a host, a packet at a tunnel end point at a first hosting location in a multi-tenant network, the packet comprising a destination at a second hosting location in the multi-tenant network, said first and second hosting locations interconnected by a transit network, the tunnel end point operable to forward traffic received from the host, each of said hosting locations comprising its own local tenant identifiers;
memory for storing a mapping of destination tunnel end points and local tenant identifiers to global identifiers, each of the global identifiers uniquely identifying a tenant across all hosting locations in the network, the local tenant identifiers having local significance in one of said hosting locations, wherein at least one of said global identifiers is mapped to different said local tenant identifiers at different of said hosting locations and a same local tenant identifier is used to identify different tenants at said first and second hosting locations; and
a processor for performing a lookup for the destination at said second hosting location, identifying a local tenant identifier for the destination at said second hosting location and a destination tunnel end point associated with the destination at said second hosting location based on said mapping, inserting the destination tunnel end point and the local tenant identifier into the packet, and forwarding the packet from the tunnel end point using the destination tunnel end point and the local tenant identifier;

wherein the local tenant identifier is used to tag traffic in a data plane and the global identifier is used in a control plane.

10. The apparatus of claim 9 wherein performing a lookup comprises performing a lookup in a demand based network database comprising the destination, the destination tunnel end point, the global identifier, and the local tenant identifier.

11. The apparatus of claim 9 wherein performing a lookup comprises performing a lookup in a routing information base.

12. The apparatus of claim 9 wherein the memory comprises a plurality of network segment containers.

13. The apparatus of claim 9 wherein the local tenant identifier comprises a virtual network identifier.

14. A non-transitory computer readable storage medium storing instructions for execution at a processor and when executed operable to:
perform a lookup in a database for a destination identified in a packet received from a host in a multi-tenant network, the database comprising a mapping of global identifiers to local tenant identifiers and destination tunnel end points for different hosting locations, each of the global identifiers uniquely identifying a tenant across all of the hosting locations, wherein said global identifiers are mapped to different said local tenant identifiers for different said hosting locations and a same local tenant identifier is used to identify different tenants at said different hosting locations;
identify a local tenant identifier for the destination and a destination tunnel end point associated with the destination based on said mapping;
insert said local tenant identifier for the destination and said destination tunnel end point associated with the destination into the packet; and
forward the packet using the destination tunnel end point and the local tenant identifier;
wherein the packet is received at a first hosting location and the destination is at said second hosting location in the multi-tenant network and wherein each of the local tenant identifiers mapped to one of the global identifiers is locally significant in one of the hosting locations; and
wherein the local tenant identifier is used to tag traffic in a data plane and the global identifier is used in a control plane.

15. The non-transitory computer readable storage medium of claim 14 wherein instructions are further operable to store the destination tunnel end point and the local tenant identifier in memory associated with the global identifier.

16. The non-transitory computer readable storage medium of claim 14 wherein an entry in the database comprises the destination, the destination tunnel end point, the global identifier, and the local tenant identifier.

17. The non-transitory computer readable storage medium of claim 14 wherein the local tenant identifier comprises a virtual network identifier.

* * * * *